Patented Apr. 22, 1947

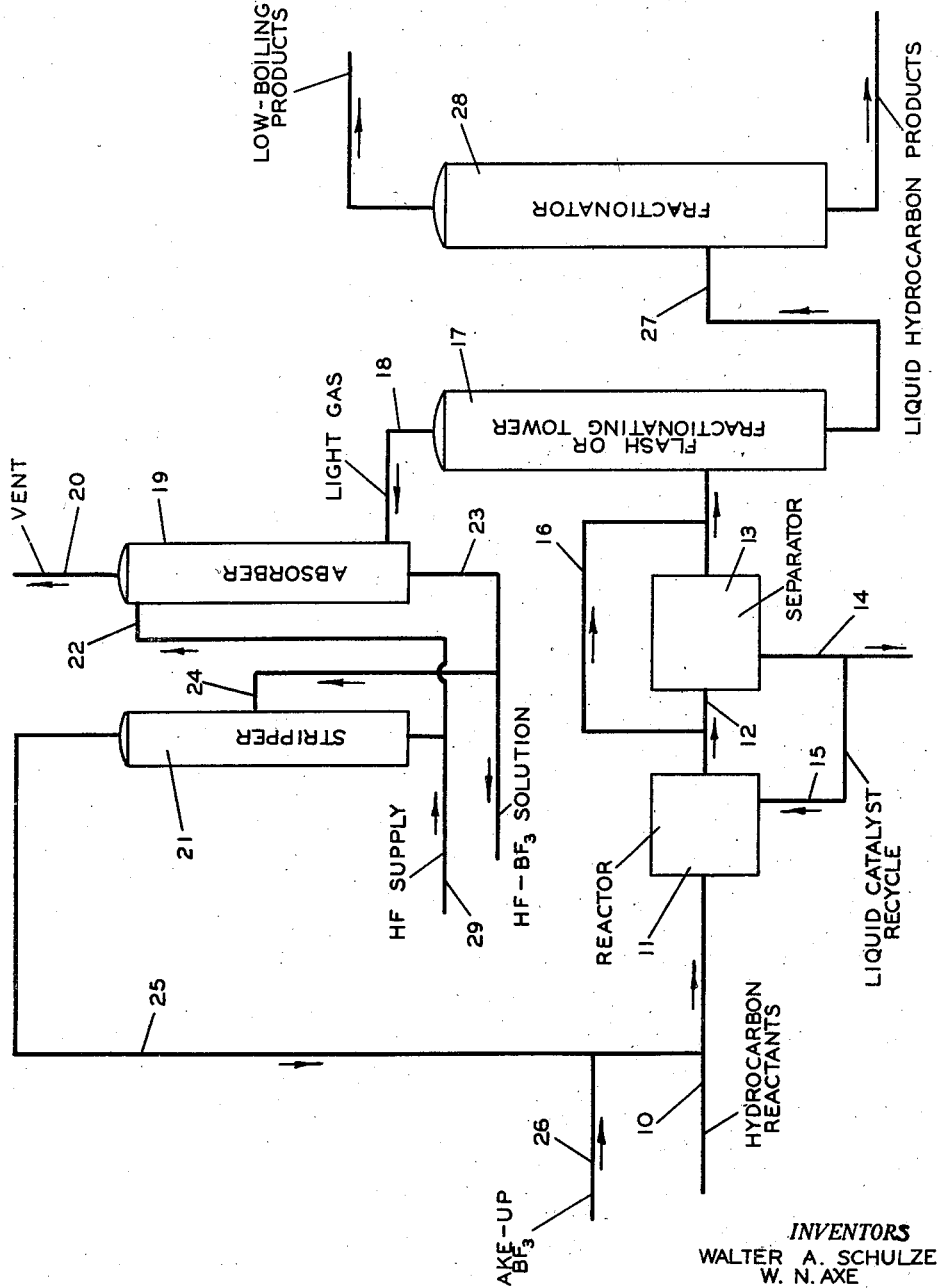

2,419,504

UNITED STATES PATENT OFFICE 2,419,504

BORON FLUORIDE RECOVERY PROCESS

Walter A. Schulze and William Nelson Axe, Bartlesville, Okla., assignors to Phillips Petroleum Company, a corporation of Delaware Application December 7, 1942, Serial No. 468,109

3 Claims. (Cl. 23—205)

This invention relates to recovery of boron fluoride and to the catalytic reactions of normally gaseous or low boiling liquid hydrocarbons conducted in the presence of catalysts comprising boron fluoride and/or promoted by gaseous boron fluoride. More specifically this invention relates to such important commercial processes as olefin polymerization, olefin-paraffin or olefin-aromatic alkylation, isomerization, and the like, which are further characterized by the use of catalysts comprising boron fluoride and by the presence of boron fluoride in the reaction products. Still more specifically, this invention concerns the separation and recovery of boron fluoride from the hydrocarbon effluent of such processes.

One object of our invention is to provide more efficient reaction systems for hydrocarbon reactions involving boron fluoride in free and/or combined form. Another object is to prevent the loss of boron fluoride from said reaction systems. A further object is to improve the yields of valuable hydrocarbon products from said catalytic reactions and prolong catalyst life through efficient recovery of highly volatile catalyst components. A still further object is to provide an improved process for conducting reactions of the type described wherein novel means are employed to separate boron fluoride from light hydrocarbons and to recover same in useful form.

It is known that several types of catalytic reactions, involving usually low-boiling olefins and/or paraffins and in some cases aromatic compounds such as benzene may be utilized to prepare higher molecular weight products of great value in the manufacture of aviation and motor fuels. In some cases, the light olefins, e. g. butylenes and propylene, may be catalytically polymerized to dimers, codimers, etc., after which the products may be hydrogenated to produce high octane isoparaffins. In other cases the isoparaffins may be formed directly through catalytic alkylation of lower molecular weight isoparaffins with olefins. In still other instances catalytic isomerization may be employed to convert paraffins to bore highly branched chain structure to improve the octane number or to prepare intermediate products for use in alkylation reactions.

The catalytic promotion of said reactions by agents such as aluminum halides, other metal halides, strong mineral acids, and the like, has been proposed, with each type of catalyst exhibiting a characteristic order of activity and selectivity when applied to various hydrocarbon feed stocks in the different reactions.

More recently, in order to extend the aforesaid reactions to a broader range of paraffin, olefin and aromatic reactants, and to increase yields of particularly valuable compounds, specific attention has been given to an improved type of catalyst containing boron fluoride. Prior use of gaseous boron fluoride as a polymerization and condensation agent has been limited due to difficulties attending its use, and particularly to the inability to recover the relatively expensive boron fluoride and thus bring catalyst costs in such processes to an economically feasible level.

Furthermore, still more recently, we have discovered that certain liquid inorganic compositions containing boron fluoride, apparently representing a sort of addition complex with compounds such as water, oxy-acids of phosphorous and aqueous hydrogen fluoride are excellent catalysts for polymerization, alkylation and isomerization reactions under proper conditions. This type of catalyst may, however, under reaction conditions, release boron fluoride to the hydrocarbon reactants, and in some modifications of processes using these catalysts, enormous benefits are derived from the inclusion of minor proportions of boron fluoride in the hydrocarbon feed. The recovery and recycling of the boron fluoride is usually a requisite for economical process operation.

The recovery of boron fluoride in the operation of such processes is often complicated by the presence of light hydrocarbon gases introduced as impurities in feed stocks or formed in the reaction, which interfere with the separation of gaseous boron fluoride from liquid products by conventional means. This is particularly true when $C_2$ and $C_3$ or lower boiling hydrocarbons are present and are separated as gases along with boron fluoride in depropanizing, debutanizing or other fractionation steps applied to the reaction products. In such cases, recycle of the entire gas mixture is often undesirable and the boron fluoride must be absorbed and concentrated from gas streams which are usually relatively dilute with respect to boron fluoride. It is possible to remove the boron fluoride from such mixtures by reaction with water, ammonia or aqueous alkaline solutions. However, such reagents are not adapted to the easy or economical recovery of boron fluoride since the reaction products are not decomposed except under the effects of high temperature, reduced pressures, and often the action of such reagents as fuming sulfuric acid.

We have now discovered that greatly improved process operation and economy and efficient utilization of catalysts comprising free and/or combined boron fluoride may be obtained by the use of a selective absorbent for boron fluoride recovery from the reaction products. The specific absorbing medium which is the basis of the present invention is liquid substantially anhydrous hydrofluoric acid. The conditions and manner of its use further constitute an improved method for the conducting of reactions of the type described.

While generally applicable to the absorption of boron fluoride from any mixture in which interfering reactions are not induced by the chemical nature of the absorbent, the process of the present invention has particular uses in the treatment of hydrocarbon gases such as are evolved or separated in the processing reaction products from polymerization, alkylation or isomerization reactions. In such applications, the basic process steps often include the following: (1) Flashing or distillation of low boiling gases including boron fluoride from liquid or easily liquefiable products, (2) treatment of the evolved vapors either with or without further fractionation with liquid hydrogen fluoride to selectively absorb boron fluoride; (3) stripping or desorbing boron fluoride from the hydrogen fluoride by appropriate adjustment of temperature and pressure conditions; (4) returning the boron fluoride to further catalytic uses. An auxiliary modification under suitable conditions may also involve the use of the hydrogen fluoride-boron fluoride solution, after absorption of desired proportions of boron fluoride, in the same or in a separate process wherein such a solution may be utilized.

The sequence of operations may be further illustrated by reference to the drawing. This drawing represents a flow diagram of one possible arrangement of equipment for the practice of the present invention.

In the drawing, the hydrocarbon reactants which may be supplied from one or more separate sources are taken through line 10 to the reactor 11 for contact with a catalyst under conditions suitable for the particular reaction being carried out. After hydrocarbons and catalyst have been subjected to reaction conditions, the reaction mixture is removed through line 12 to process equipment for the separation and recovery of the various components.

In case a liquid catalyst is present as a separate phase, the reaction mixture may pass through line 12 to separator 13, wherein the catalyst is separated and withdrawn through line 14. A part or all of the separated catalyst may be returned, sometimes after reconditioning treatment, through line 15 to the reactor. The hydrocarbon products then pass to a primary flash or fractionating tower 17 where components which are to comprise the overhead light gas or vapor stream are separated. In case the catalyst does not exist as a separate phase, the entire reaction mixture may pass from the reactor through line 16 to tower 17.

The light gas mixture taken overhead in tower 17 is usually fractionated in such a manner that substantially all free boron fluoride which leaves the reactor is contained therein. This degree of fractionation or separation may be obtained in a single tower or fractionating column, or, if desired, additional equipment may be provided to make a more precise separation.

The exact function of tower 17 may vary both with the feed composition, the reaction being carried out and the nature of the catalyst and reaction products. Thus, in alkylation reactions involving light olefins such as ethylene or propylene, $C_3$ and lighter products may be taken overhead in tower 17. Similarly, in polymerization of a mixed olefin stream or isomerization of n-butane, a depropanizing operation may be most desirable. In most instances it is preferred to flash or vaporize the smallest volume of gas mixture which will effect the substantially complete separation of boron fluoride from the hydrocarbon reaction products, and at the same time to prepare said reaction products for subsequent fractionation operations which separate unconverted reactants from the product stream.

The gas mixture from tower 17 is taken through line 18 to absorber 19 which is operated at conditions of temperature and pressure consistent with substantially complete boron fluoride absorption. The absorber may be a packed tower or may be provided with trays, baffles or other means of assuring contact between the liquid hydrogen fluoride and the gas stream which in many cases passes upward countercurrent to the absorbing liquid. The hydrogen fluoride is supplied from either an outside source (via line 29) or from stripping column 21, usually through a surge tank and cooling devices (not shown), and line 22 to the top of absorber 19. The light gas free from boron fluoride leaves the top of absorber 19 via line 20 and is thereby vented from the system. The liquid from the bottom of absorber 19 containing boron fluoride in solution is withdrawn through line 23 and all or a portion of the solution passes through line 24 to stripping column 21.

In stripping column 21, the boron fluoride is stripped from the absorbent by adjusting the temperature and pressure conditions to give a suitable rate of evolution of boron fluoride gas. This gas is taken through line 25 to be recycled to the reactor 11 and used again in the catalytic reaction. Make-up boron fluoride to replace any consumed or otherwise lost or withdrawn from the system is supplied through line 26.

Subsequent fractionation operations on the hydrocarbon product stream from the bottom of tower 17 are indicated by fractionator 28. The feed enters by line 27 and the fractionation is carried out according to the feed composition and components to be separated. For example, in an alkylation process, the separation may be between unconverted isobutane and normally liquid alkylate, while if olefin polymers are the principal product, the overhead stream may comprise unreacted olefins or paraffin impurities present in the olefin feed mixture.

In some cases, the boron fluoride separation and the light hydrocarbon separation may even be combined into a single step, with the major portion of the boron fluoride being taken off in a gas stream from reflux accumulator or partial condenser. These and other modifications of the process steps corresponding to different applications of the present invention will be obvious from this disclosure.

The total quantity of boron fluoride to be absorbed and recovered will depend largely on the particular reaction being carried out and the form in which the catalyst is utilized. Thus, in polymerization reactions carried out with boron fluoride alone as the catalyst or with only minor amounts of promoters, 5–10 weight per cent of boron fluoride may be present in the olefin-containing feed mixture. On the other hand, in reactions such as alkylation utilizing liquid boron fluoride complex catalysts, the amount of boron fluoride to be recovered from the effluent may correspond to only that quantity mechanically transferred to the liquid hydrocarbon phase. And when boron fluoride is added to reactions utilizing said liquid complex catalyst to maintain catalyst activity, the amount is ordinarily less than about 2 weight per cent of the hydrocarbon feed.

In view of the above-mentioned variations in the total quantity of boron fluoride to be recovered, and further in view of corresponding differences in the volume of the total gas mixture to be treated with hydrogen fluoride absorbent, the volume of absorbent and the absorbing conditions are ordinarily adjusted to suit the individual operation, and according to conventional absorption practices.

It is preferred to operate the absorber at about atmospheric or lower temperatures in order to favor the absorption, while pressures are selected in accordance with the temperature and the composition of the gas stream. Since hydrogen fluoride itself boils at a relatively low temperature (about 68° F.) substantial superatmospheric pressures are preferred to maintain the absorbent in liquid phase and reduce its vapor pressure to such an extent that carrying-out of hydrogen fluoride in the vented gas stream will not cause uneconomic losses. At the same time, pressures and temperatures are so regulated within the above-mentioned limits that substantially no condensation of hydrocarbons occurs to contaminate both the absorbent and the desorbed boron fluoride.

In many instances, satisfactory conditions for the absorption may be obtained at temperatures between about 40 and about 100° F., and at pressures in the range of about 50 to about 500 pounds gage.

The volume of absorbent circulated per unit volume of the boron fluoride-containing gas stream will vary with the boron fluoride concentration. In most cases it is preferred to circulate enough hydrogen fluoride to maintain the resulting rich solution at only a fraction of the saturation value at the absorption conditions. In this way more complete boron fluoride absorption may be obtained at lower pressures.

The desorption or stripping of the boron fluoride from the rich absorbent is accomplished in a stripping zone by the application of heat, reduction of pressure or both. The dissolved boron fluoride is desorbed at relatively low temperatures, and temperatures of about 70 to about 120° F. usually give a satisfactorily rapid rate of desorption at atmospheric or low superatmospheric pressures. Higher or low temperatures may be employed as the pressure is increased or decreased. In general, pressures are selected which enable the use of minimum stripping temperatures without introducing any difficulties in the condensation and return of vaporized hydrogen fluoride to the stripping zone.

It is a particular advantage of the present invention that the physical and chemical characteristics of the absorbent permit the stripping or flashing of the boron fluoride at low temperatures and substantially free of contaminants which might interfere with subsequent utilization of the recovered boron fluoride. These factors together with the exceptional solubility of boron fluoride in hydrogen fluoride contribute to the efficiency of the process.

The following will illustrate an application of the recovery process in the catalytic alkylation of isobutane with ethylene: When isobutane is alkylated with an ethylene concentrate in the presence of boron fluoride hydrate catalyst promoted with hydrogen fluoride, from 1 to 2 weight per cent of boron fluoride is incorporated in the isobutane feed to maintain catalyst activity. The hydrocarbon reaction mixture containing boron fluoride is first fractionated to separate ethane, propane and boron fluoride from the $C_4$ and heavier hydrocarbons. In order to separate the boron fluoride from the light hydrocarbon gases and recover it in suitably pure form for recycling, the gas stream may be contacted with liquid hydrogen fluoride in an absorber at 70° F. and 250 p. s. i. gage, whereby the boron fluoride is selectively absorbed from the light hydrocarbons. The hydrogen fluoride-boron fluoride solution in a stripping zone, operated at 100° F. and 80 pounds gage pressure, is stripped of boron fluoride which passes to the isobutane feed stream for return to the reactor. Small amounts of hydrogen fluoride in the recycle boron fluoride are absorbed by the alkylation catalyst.

Other reactions in which this invention may be practiced will be apparent from the foregoing discussion, and no limitation to any particular reaction or boron fluoride containing catalyst composition is intended.

We claim:
1. The process of recovering boron fluoride from normally gaseous hydrocarbon mixtures containing the same in free form which comprises intimately contacting said mixture in the gaseous state with an absorption medium consisting essentially of liquid anhydrous hydrofluoric acid and thereby effecting selective absorption of said boron fluoride, separating said anhydrous hydrofluoric acid containing said dissolved boron fluoride, and stripping said dissolved boron fluoride from said hydrofluoric acid by heating said absorption medium.

2. The process of claim 1 in which said absorption is conducted at temperatures of 40 to 100° F. and at pressures of 50 to 500 pounds gage.

3. The process of recovering boron fluoride from hydrocarbon mixtures containing the same in free form which comprises intimately contacting said mixture in the gaseous state with an absorption medium consisting essentially of liquid anhydrous hydrofluoric acid and thereby effecting selective absorption of said boron fluoride, carrying out said absorption under conditions of temperature and pressure such that said hydrofluoric acid is maintained in liquid form and that substantially no condensation of hydrocarbon from said mixture takes place, separating said anhydrous hydrofluoric acid containing said dissolved boron fluoride, and stripping said dissolved boron fluoride from said hydrofluoric acid by heating said absorption medium.

WALTER A. SCHULZE.
WILLIAM NELSON AXE.

REFERENCES CITED

The following references are of record in the file of this patent:

UNITED STATES PATENTS

| Number | Name | Date |
| --- | --- | --- |
| 2,167,358 | Gleason | June 25, 1939 |
| 2,097,482 | Weber | Nov. 2, 1937 |
| 2,320,629 | Matuszak | June 1, 1943 |

(Other references on following page)

| Number | Name | Date |
|---|---|---|
| 1,906,467 | Heath | May 2, 1933 |
| 2,176,234 | Gaylor | Oct. 17, 1939 |
| 2,343,744 | Burk | Mar. 7, 1944 |
| 2,310,327 | Sweeney | Feb. 9, 1943 |
| 2,220,092 | Evering | Nov. 5, 1940 |
| 2,344,890 | Whiteley | Mar. 21, 1944 |
| 2,284,554 | Beyerstedt | May 26, 1942 |
| 2,363,116 | Bruner | Nov. 21, 1944 |
| 2,348,637 | Meinert | May 9, 1944 |
| 2,160,576 | Loder | May 30, 1939 |

OTHER REFERENCES

Booth & Martin, Systems with Boron Trifluoride, Journal of the American Chemical Society, volume 64, pages 2198–2205, particularly pages 2201 and 2202, Sept. 1942 (but from a thesis submitted May 1941 footnote 1). (Copy in Division 59, 23–205.)